(No Model.)

J. W. MALOY.
STONE CUTTING SAW.

No. 357,214. Patented Feb. 8, 1887.

Attests:
John G. Hinkel Jr.
A. G. Fansmann.

Inventor:
Jas. W. Maloy,
By Foster & Freeman
Attys.

N. PETERS, Photo-Lithographer, Washington, D. C.

UNITED STATES PATENT OFFICE.

JAMES W. MALOY, OF SOMERVILLE, ASSIGNOR TO THE AMERICAN MARBLE COMPANY, OF BOSTON, MASSACHUSETTS.

STONE-CUTTING SAW.

SPECIFICATION forming part of Letters Patent No. 357,214, dated February 8, 1887.

Application filed March 11, 1886. Serial No. 194,878. (No model.)

*To all whom it may concern:*

Be it known that I, JAMES W. MALOY, a citizen of the United States, and a resident of Somerville, in the county of Middlesex and State of Massachusetts, have invented a certain new and useful Improvement in Stone-Saws, of which the following is a specification.

My invention is a stone-saw having for its object to obviate the difficulties attending the use of the ordinary stone-saws, which generally consist of blades having a uniform thickness; and my invention consists in a stone-saw having the lower or cutting edge thicker than the upper edge and plane flat sides between said edges, as fully set forth hereinafter, and as illustrated in the accompanying drawings, in which—

Figure 1:
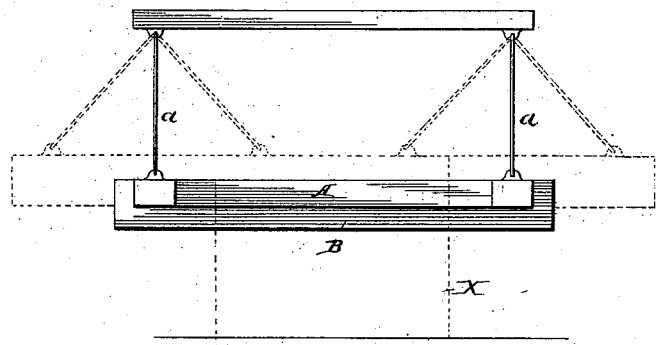
Figure 2:
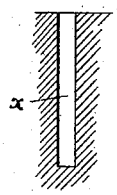
Figure 3:
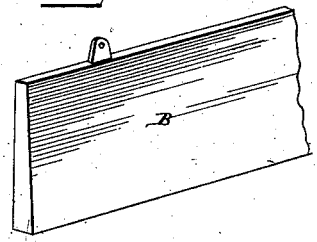
Figure 4:
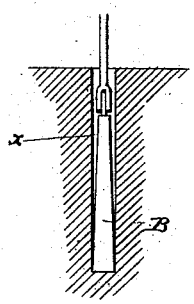

Figure 1 is a side view illustrating the saw as arranged in a frame for cutting stone. Fig. 2 is a cross-sectional view of a stone, illustrating the character of the groove which it is desired to cut. Fig. 3 is a perspective view illustrating my improved saw. Fig. 4 illustrates in a cross-sectional view a saw embodying my improvement within a cut formed in a stone.

In the ordinary stone-cutting saws, such as are ordinarily used in gangs, each saw consists of a straight blade of metal having a uniform thickness, provided with a plain edge, which is brought into contact with the slab or block of stone, and, in conjunction with a proper abrading material, cuts the latter.

The usual arrangement of stone-saws is illustrated in Fig. 1, in which A represents the usual saw-frame suspended by links *a a* from vertically-moving supports, so as to feed the gang of saws downward as the stone is cut; and B represents one of the saws of the gang, the stone being shown in dotted lines X. Each saw-blade, in the usual construction, has a cross-section of rectangular form, and it is desired that the operation of the saw shall cut in the stone a groove, *x*, of uniform width, as shown in Fig. 2; but in actual practice the lower cutting-edge of the saw-blade, by contact with the stone and the abrading material used in conjunction with said saw, is speedily worn away, the blade assuming a wedge shape, and the cut or groove in the stone, instead of having parallel sides, as shown in Fig. 2, has converging sides.

As a result of the above-described operation the blade of the saw is not only reduced in thickness, as above stated, but there also is created a constantly-increasing resistance to the movement of said blade in its cut, which resistance is due to the constantly-increasing extent of surface exposed by said saw to contact with the sides of the cut and the abrading material, as will be understood.

To obviate the above-described objectionable features in the use of stone-saws, I construct my improved saw in the form illustrated in perspective in Fig. 3 and in cross-section in Fig. 4, which figures represent a blade formed in a single piece having parallel upper and lower edges, one of which—the lower or cutting edge—is thicker than the other and with flat sides, which are inclined toward each other as they approach the upper edge.

When a saw-blade thus constructed is brought into contact with a stone and operated in the usual way, it will cut therein a groove with parallel sides, as shown in Figs. 2 and 4, inasmuch as the lower or cutting edge, whatever may be the extent to which the saw is worn as regards its width, will always be the thickest portion of the blade, and the groove cut by said blade will always be wider than the thickness of the portion of said blade above its cutting-edge, so that the sides of said blade can never be brought into frictional contact with the sides of the groove, and there will therefore be no cutting or wearing away of the sides of the blade, while the abrading material will more readily pass down the sides of the saw-blades to and below the lower cutting-edge thereof than when the blade fills closely the groove in the stone; and, further, said abrading material will remain in loose condition above said cutting-edge and only be brought into frictional or abrading contact with the stone below its lower or cutting edge.

I do not broadly claim a saw with converging sides, as I am aware that a saw having converging sides and edges, one of which is a toothed edge and adapted to cut wood, is not new, from which constructions my invention is distinguished in that I construct my saw-blade with converging sides, parallel edges, and thick smooth cutting-edge—that is, an edge without teeth or projections—to be used in connection with suitable abrading material to cut or saw stone.

I claim—

A stone-saw consisting of a blade formed of a single piece of metal, provided with a smooth lower or cutting edge parallel with the upper edge and converging sides, substantially as described.

In testimony whereof I have signed my name to this specification in the presence of two subscribing witnesses.

JAMES W. MALOY.

Witnesses:
GEORGES TAUBER,
WILLIAM HÜNING.